United States Patent [19]

Peterson

[11] Patent Number: 4,909,688

[45] Date of Patent: Mar. 20, 1990

[54] MOUNTING PART, FASTENER

[75] Inventor: Francis C. Peterson, Woodbury, Conn.

[73] Assignee: Buell Industries, Inc., Waterbury, Conn.

[21] Appl. No.: 136,099

[22] Filed: Dec. 21, 1987

[51] Int. Cl.⁴ ............................................. F16B 37/00
[52] U.S. Cl. ...................................... 411/173; 411/501
[58] Field of Search ........................ 403/407.1, 408.1; 411/19, 36, 501, 500, 173, 177, 181–183, 907, 908

[56] References Cited

U.S. PATENT DOCUMENTS

| | | | |
|---|---|---|---|
| 1,873,895 | 8/1932 | Kimbell | 411/177 |
| 2,108,975 | 2/1938 | Sorensen | 411/183 |
| 2,185,939 | 1/1940 | Deshon et al. | 411/501 X |
| 2,321,755 | 6/1943 | Kost | 411/501 X |
| 2,453,991 | 11/1948 | Kaemmerling | 411/501 X |
| 2,571,290 | 10/1951 | Quigley | 411/181 |
| 2,594,840 | 4/1952 | Allison | 411/501 X |
| 3,015,140 | 1/1962 | Pender, Sr. | 411/501 X |
| 3,404,596 | 10/1968 | Ryder | 411/36 |
| 3,826,458 | 7/1974 | Fisher | 411/173 X |
| 4,186,787 | 2/1980 | Husain | 411/183 |

Primary Examiner—James R. Brittain
Attorney, Agent, or Firm—St. Onge Steward Johnston & Reens

[57] ABSTRACT

An improved mounting part is designed for use in securing plastic panels to a metal framework. The mounting part comprises a base plate which is mechanically fastened to the framework by means of substantially oblong cups which are inserted into corresponding slots in the framework and then deformed into round; and a rectangular block for receiving a screw. The plastic panel is secured to the framework by means of a screw threaded fastener which is inserted through an opening in the panel and screwed into a guide hole drilled into the rectangular block and then into the framework. The improved fastener eliminates problems of rust initiation caused by the welded mounting part of the prior art, and acts as a combination of a stand-off washer and a nut.

6 Claims, 2 Drawing Sheets

MOUNTING PART, FASTENER

FIELD OF THE INVENTION

The present invention relates to an improved mounting part for use in securing panels to a framework.

DESCRIPTION OF THE PRIOR ART

A known mounting part used in the automotive industry for securing plastic automotive body panels of a vehicle to a metal framework is made by shaping a metal sheet into an open box having a wide flange extending laterally from the edges of the open end of the box. This open box is typically filled with a polymeric material cast in place in the metal box. This known mounting part is welded to the metal framework of the vehicle with the flanges and the open side of the box and the polymeric filler against the framework. Plastic body panels are then fastened to the metal framework by use of screws inserted through the body part and which are screwed into guide holes drilled into the base of the metal box, through the polymeric filler and into the metal framework.

It has been found that several practical drawbacks are associated with the prior art assembly. The welding step which fastens the mounting part to the vehicle frame accelerates development of rust on the frame. Frame rust can weaken the vehicle frame and eventually cause the vehicle to be unsafe for use. Furthermore, the metal box in the mounting part must be drilled through, leading to dulling of drill bits used to drill the guide holes for the screws which secure the plastic body parts to the frame.

SUMMARY OF THE INVENTION

It is the object of the present invention to provide an improved mounting part, fastener and method for use in securing plastic panels to a metal framework which avoids the shortcomings of the known mounting part. More particularly, the present invention provides an improved mounting part which is fastened to a vehicle frame without welding. It is a further object of the present invention to provide a mounting part which can be manufactured and installed at a lower cost than prior art devices.

The mounting part in accordance with the present invention comprises a base having mechanical fastening means for securing the base to the metal framework of a vehicle, and a rectangular block of screw threading polymeric material for receiving a screw at varying locations. The mechanical fastening means comprises at least one substantially oblong deformable cup formed on the base which is inserted into a corresponding slot in the framework. By rotatably deforming the portion of the oblong cup which extends from the slot, the extending end will have a larger diameter than the slot, thereby securing the mounting part to the framework. The deformation of the oblong cups is achieved by use of a rotatable tool with an oblong tip which fits into the open end of the oblong cups.

Once the mounting part is secured to the vehicle framework, the plastic body panels are aligned over the vehicle framework; a guide hole is drilled through the panel, the block and the framework, and a self-tapping screw threaded fastener is inserted through the opening in the plastic panel and screwed into the guide hole in the block and into the metal framework. In some cases the panel will be cast with an opening already in it, and this opening may be used to locate the guide hole in the block.

The use of the mechanical fastening means of the present invention allows the mounting part to be positioned on and fastened to the metal framework by computer controlled machinery. The fastening means is less costly in use than the prior art welding step because the power requirements of the fastening means of the present invention are much lower than those where welding is employed. Furthermore, the mounting part of the present invention is much easier to remove from the framework if and when parts are improperly aligned.

Therefore, the improved mounting part and the apparatus and method of the present invention represent a substantial improvement over prior art devices because they do not initiate rust formation, and because they reduce the costs of mounting plastic panels to a framework.

Other objects, aspects and features of the present invention in addition to those mentioned above will be pointed out in or will be understood from the following detailed description provided in conjunction with the accompanying drawings.

DETAILED DESCRIPTION OF THE PREFERRED EMBODIMENTS

Figure 1:
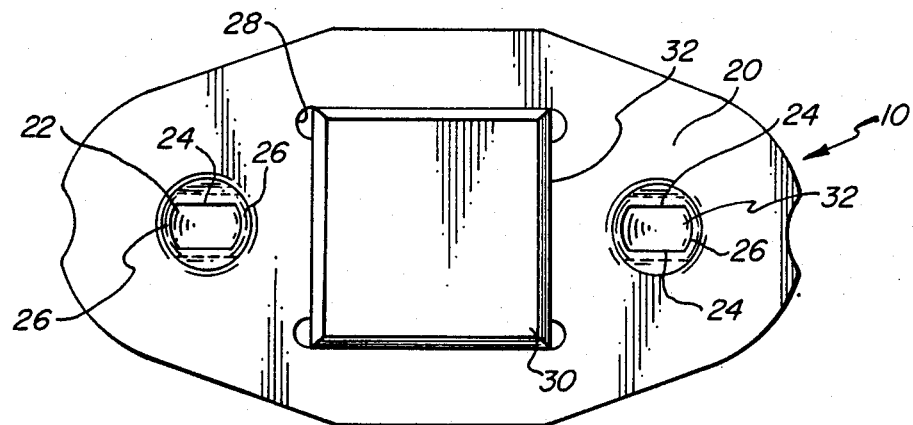
FIG. 1 is a top plan view of the mounting part.
Figure 2:
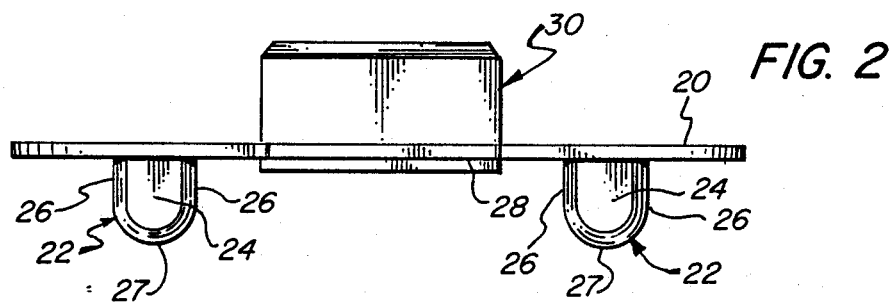
FIG. 2 is a side view of the mounting part.
Figure 5:
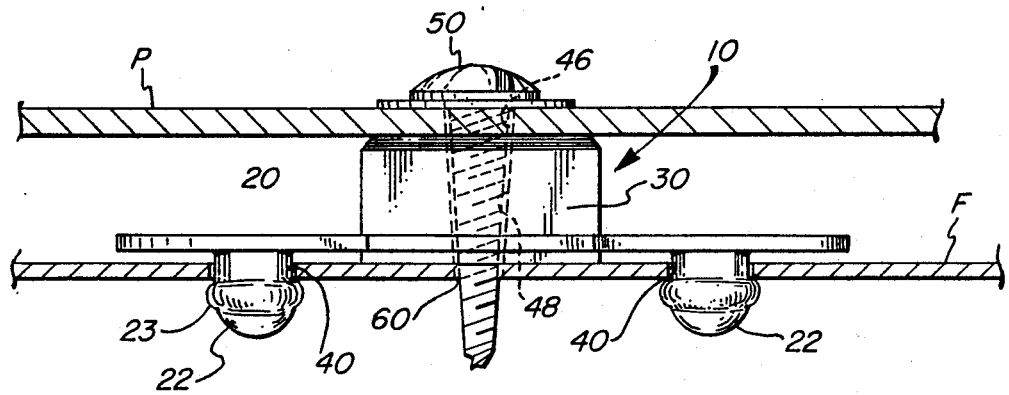
FIG. 5 is a side view of the mounting part attached to a framework with a body panel secured thereto.

As shown in FIGS. 1 and 2, the mounting part of the present invention, generally indicated at 10, comprises a sheet material base 20 having a rectangular block 30 located at the center of the base 20. The base 20, shown as base plate formed from sheet metal, has at least one, and preferably two substantially oblong deformable cups 22 which extend perpendicularly from the base plate 20. The oblong cups 22 can be formed by drawing circular cups from the base plate 20 and stamping the outer surfaces of the cups with parallel plates. This provides a cup with flat parallel sides 24, rounded ends 26 and a hemispherical end 27. The cups are drawn to a sufficient depth, as shown in FIG. 5, such that they can penetrate the metal framework of the vehicle when they are inserted into matching slots 40 in the vehicle framework.

The base plate 20 is provided with a square opening 28 in to which is fitted a rectangular solid block 30. The block 30 is formed from a rigid polymeric compound which can be readily processed by machine tools, and is drillable and screw threadable. The block 30 is held in place by at least two tabs 32 formed on the base plate 20 and extending into the opening 28; the tabs 32 fit into slots cut into opposite faces of the block 30.

Figure 3A:
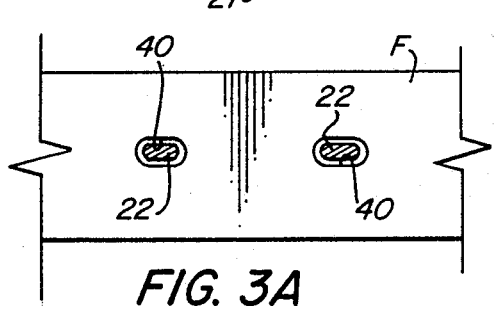
FIG. 3A shows two oblong cups in plan view before deformation.
Figure 3B:
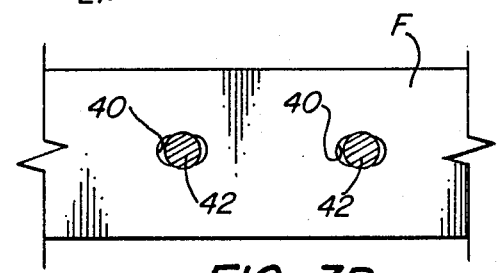
FIG. 3B shows two cups in plan view after deformation.
Figure 4A:
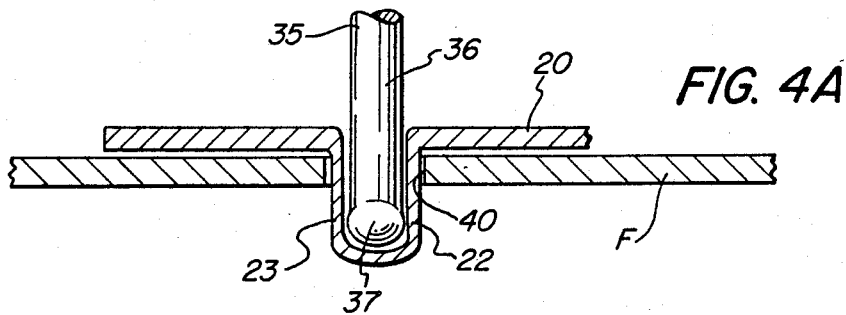
FIG. 4A shows an oblong cup and rotatable tool in cross-section before deformation of the cup.
Figure 4B:
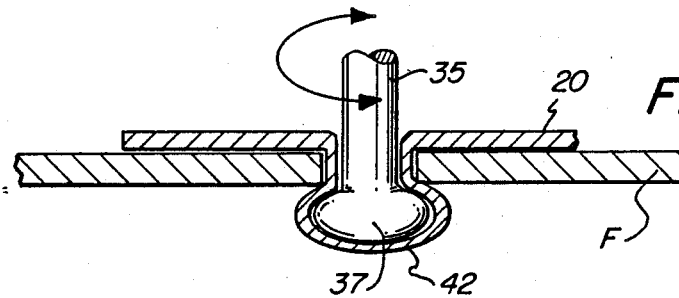
FIG. 4B shows an oblong cup and rotatable tool in cross-section after deformation of the cup.

As shown in FIGS. 3 and 4 the mounting part 10 is secured to the vehicle framework F by the deformation of the cups into round. FIGS. 3A and 4A shows the oblong cups 22 inserted into slots 40 in the metal framework F. The slots 40 are usually substantially oblong holes punched into the framework which are of about the same width as the distance between the outer sides of the flat parallel faces 24 of the cups 22; the slots 40 may have a longer length than the distance between the outer faces of the rounded sides 26 of the cups 22 to allow for positioning adjustments prior to fastening the mounting part 10 to the framework F. The cups 22, once inserted into the framework will have protruding portions 23, as shown in FIGS. 4A and 5. These protruding portions 23 are deformed by use of an oblong tipped tool 35, which is fitted into the open end of the cups 22 and rotated through at least 90 degrees and preferably 180 degrees of arc, to act against the inside surface of the cups, until the flat parallel sides 24 are deformed generally into round, as shown in FIG. 3B and 4B at 42. The round formations 42, being larger in diameter than the width of the slots 40, are prevented from passing back through the openings, and thus the mounting part 10 is secured to the framework F. The oblong tip tool 35 can then be withdrawn from the cups.

The oblong tip tool 35 will have a circular shank 36 having a diameter slightly less than that of the width of the slot 40 adjacent the oblong tip 37. The circular shank 36 allows the tool to rotate without binding in the slot 40. The rotational force may be supplied by any rotation means of sufficient torque to deform the cups 22.

The rectangular block 30 is intended to receive a self-tapping screw threaded fastener 50 which has a head disposed outside a plastic panel P, and which is inserted through an opening 46 in the panel P., and which engages the plastic block 30 and the framework F.

Since there can be variation in the relative location of the framework, the panel, and the plastic block 30, as well as variation in the size of adjacent parts, alignment of all parts can be difficult to achieve. The design of the mounting part accommodates this problem and allows various parts to be jigged up and aligned before fastening. This alignment is maintained, and variations allowed for, by having a relatively large plastic block 30 in comparison to the screw fastener 50. Once the mounting part 10 is secured to the framework F by the mechanical fastening means, the plastic panels P can be jigged up, and panel opening 46 and guide hole 48 and hole 60 in framework F can be drilled in exact alignment at exactly the point where needed to fasten the plastic panel P to the framework F. The fastener 50 is then inserted through hole 46 in body panel P, and threaded into guide hole 48 and engages framework F as shown in FIG. 5.

The mounting part serves the functions of both a nut and a stand-off washer, and allows the secure fastening of a plastic panel P to a sheet metal framework F at varying locations.

The unique design and assembly of the mounting part of the present invention enhances the economy and reliability with which plastic panels may be attached to a sheet metal framework, because the mounting part can be positioned and fastened without welding. In addition, the mounting part allows fastening of a screw over a range of locations, obviating difficulties in alignment between a plastic panel and the sheet metal framework.

I claim:

1. A fastener for securing a sheet material part to a framework having at least one slot therein, comprising: at least one deformable substantially oblong cup adapted to extend from one side of the sheet material part, said cup having a generally hemispherical end portion and wall portions, said wall portions comprising two generally flat wall portions connected to each other by two generally curved wall portions, said cup having an open end and a closed end, said cup being sized to fit into the slot located in the framework, said cup having a length greater than that of the thickness of the framework; whereby said sheet material part can be fastened to said framework by said fastener by inserting said closed end of said cup into the framework slot, fitting an oblong tipped tool into said open end of said cup, and rotating the tool fitted into said cup to deform the cup end extending beyond the framework.

2. A fastener in accordance with claim 1 wherein said cup is integral with said sheet material, and is formed by drawing said cup from said sheet material.

3. A mounting part for use in securing a panel to a framework having at least one slot therein, comprising: a sheet material base having an opening therein; mechanical fastening means for securing said sheet material base to the framework, said fastening means comprising a substantially oblong cup having a length greater than the thickness of the framework and having an open end and a closed end extending from one face of said sheet material base, said cup having a generally hemispherical end portion and wall portions, said wall portions comprising two generally flat wall portions connected to each other by two generally curved wall portions, said cup having an inside surface accessible from said open end, said cup being sized to fit into the framework slot and being deformable by an oblong tipped tool inserted into said cup open end and rotated to bear against said inside surface of said cup; and a substantially solid polymeric block mounted in and substantially filling said opening in said sheet material base; whereby said cup after being inserted into the framework slot has an extending end which can be deformed such that said extending end has a larger diameter than the width of the slot, securing said mounting part to the framework.

4. A mounting part in accordance with claim 3 wherein said cup is integrally formed with said sheet material base by drawing said cup from said sheet material base.

5. A mounting part in accordance with claim 3 wherein said block is a rectangular solid, said block having slots formed on at least two sides thereof, and wherein said opening in said base is rectangular, and said sheet material base has at least two tabs extending into said rectangular opening, said tabs being sized and located to fit into said block slots to secure said block to said base.

6. A mounting part for use in securing a plastic panel to a metal framework having at least one slot therein, comprising: a sheet material base having at least one deformable substantially oblong cup, said cup having a hemispherical end portion, and wall portions, said wall portions comprising two parallel flat wall portions connected to each other by two curved wall portions, said cup extending from one face of said sheet material base, said cup having a length greater than that of the thickness of a framework onto which said mounting part is to be mounted, said cup being sized to fit into the framework slot; and a rectangular screw threading block formed from a polymeric material mounted in a rectangular opening in said sheet material base.